May 18, 1954
L. FINCHER
2,678,771
AUTOMATIC REGULATING DEVICE FOR AIR
COUNTERBALANCING PUMPING UNITS
Filed Dec. 3, 1949
2 Sheets-Sheet 1
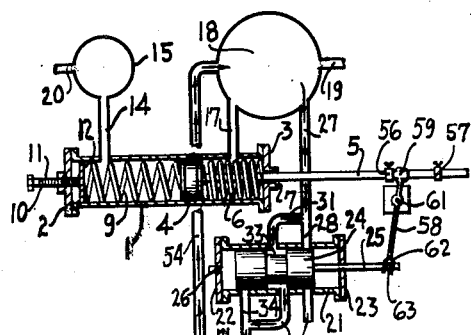
Fig. 1
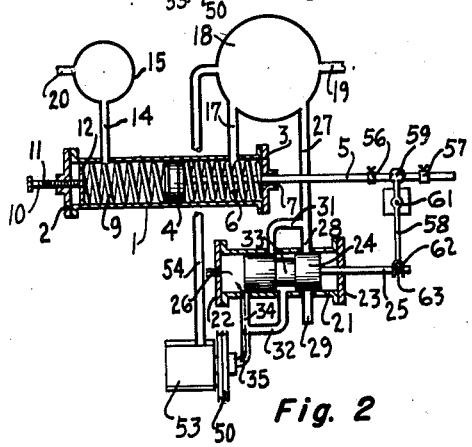
Fig. 2
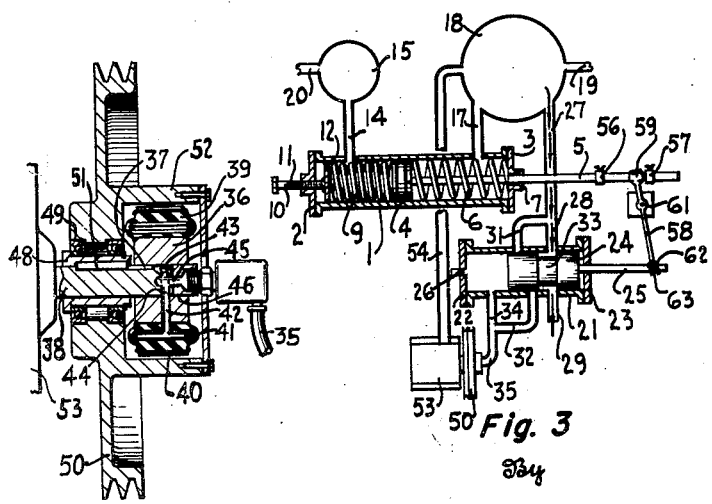
Fig. 3
Fig. 4
Inventor
Louis Fincher
Lester B. Clark
& Ray L. Smith
Attorneys May 18, 1954

L. FINCHER 2,678,771

AUTOMATIC REGULATING DEVICE FOR AIR
COUNTERBALANCING PUMPING UNITS

Filed Dec. 3, 1949

Inventor
Louis Fincher

By Geo. C. Helmig
+ Wm. E. Ford
Attorneys

Patented May 18, 1954

2,678,771

UNITED STATES PATENT OFFICE 2,678,771

AUTOMATIC REGULATING DEVICE FOR AIR COUNTERBALANCING PUMPING UNITS

Louis Fincher, Lufkin, Tex., assignor to Lufkin Foundry & Machine Company, Lufkin, Tex., a corporation of Texas Application December 3, 1949, Serial No. 130,982

6 Claims. (Cl. 230—4)

1

This invention relates to an automatic regulating device having particular application to a counter-balancing pumping unit as employed in pumping fluid from wells, as oil wells, and the theory and structure have further application to any set of conditions wherein it may be desirable to maintain a balance between two types of fluids which are in contact with each other in a closed system.

It is an object of this invention to provide a regulating device of this class which is adapted to start a compressor to increase the pressure of fluid in an air or gas cylinder which communicates with a fluid cylinder in which the fluid pressure may increase above a predetermined setting; the increased air or gas pressure thereby counter-balancing the system.

It is a further object of this invention to provide a regulating device of this class which is adapted to stop the compressor when a counter-balanced condition between air or gas pressure and liquid pressure may be attained.

It is yet another object of this invention to provide a regulating device of this class which is adapted to bleed gas or air from a gas or air cylinder to counter-balance the system when the liquid pressure falls below a predetermined setting.

It is also within the objects of this invention to provide a regulating device of this class which is adapted to maintain a balance or balanced range of operating conditions between two types of gases, as well as between a liquid and a gas, where such may be in variable pressurized contact with each other in such a manner as to maintain the unadulterated identity of each element.

Other and further objects will be obvious when the specification is considered in connection with the drawing in which:

Fig. 1 shows the regulating device when the compressor has been started to increase the air or gas pressure in the system;

Fig. 2 shows the regulating device when the compressor has been stopped after the system has been counter-balanced;

Fig. 3 shows the regulating device when it operates to bleed the gas or air cylinder when the liquid pressure of the system falls below a predetermined setting; and Fig. 4 shows a cross-section through the compressor clutch and drive to show the operation of the compressor clutch.

2

Figure 5:
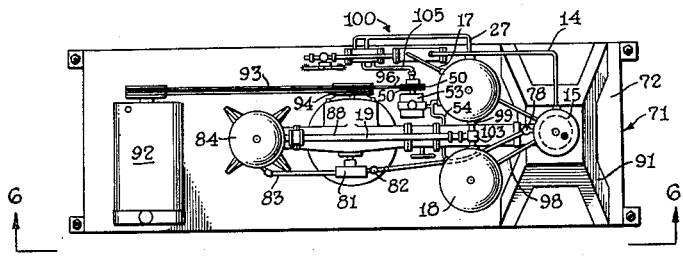
Fig. 5 is a plan view of a pumping unit.
Figure 6:
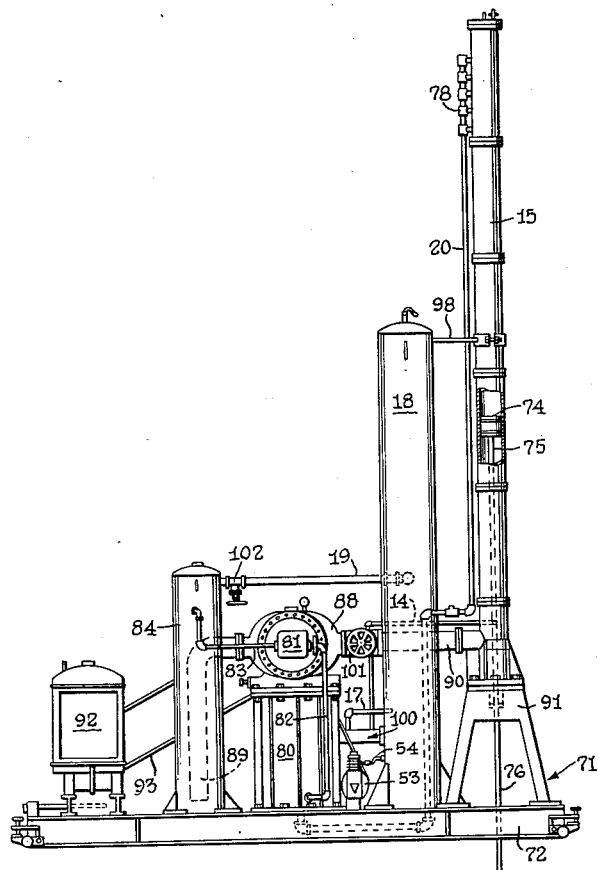

Fig. 6 is an elevation of the pumping unit, taken along line 6—6 of Fig. 5;

This invention has particular adaptation for use with pumping units such as those disclosed in my co-pending application, Serial No. 130,981, filed of even date with this application.

As shown in Figs. 5 and 6, such a pumping unit 71 comprises a base 72 having mounted thereon a vertically extending hydraulic cylinder 15 which has a piston 74 therein, the rod 75 of the piston being adapted for connection to the top sucker rod 76 of a sucker rod line which leads down into a well and is connected to a pump plunger, not shown, which picks up fluid at the bottom of the well and transfers it to the top thereof.

The cylinder 15, near the top thereof, has a series of vertically aligned valves 78 connected thereinto and a line 20 leads from these valves into a reservoir 80. A scavenger pump 81 is mounted above the reservoir and picks up fluid from the line 87 and discharges it through a line 83 into a surge tank 84. The surge tank has a line 19 connected into the top thereof which leads to air cylinders 18 which have air under pressure supplied thereinto by the compressor 53 mounted on the base 72 of the unit 71.

The self-reversing pump 88 is mounted for convenience on top of the reservoir 80 and is connected to the surge tank 84 by means of the line 89, and into the power cylinder 15 by means of the line 90 which connects thereinto near the cylinder bottom slightly above its base 91. A prime mover 92, as a gasoline engine, drives, by means of the chain or V-belt 93, the sheave 94 which drives the self-reversing pump 88. The scavenger pump 81 may, for purposes of convenience, be mounted on the end of the self-reversing pump 88 as shown in Figs. 1 and 2, and means may be provided for also driving this pump by the prime mover 92. Optionally, it may be driven by a separate drive means as a small motor, not shown. The sheave 94 also has the chain or belt 96 connected thereto to drive the compressor sheave 59, as shown in Figs. 5 and 6.

As shown in Fig. 5, the compressed air tanks 16 are supplied by the same compressor 53. These tanks, by means of cross-bars 98, may be connected to the power cylinder 15 so that the air tanks 18 and the power cylinder 15 are cross-braced for structural purposes near the top of the air cylinders and substantially centrally of the power cylinder. To complete the structurally braced triangle of members, the compressed air tanks have outlets 99 which connect into a T 103, into which is connected the line 19 to the surge tank 84. A suitable valve 101 is provided between the self-reversing pump 88 and the line 90 and a valve 102 is also provided in the air line 19 between air tanks and the surge tank 84.

The lines or connections 54 connect the compressor 53 to the air tanks 18, and the line or connection 35 leads from the compressor to the regulating device to be described in detail hereinbelow, and generally designated as 100 in Figs. 5 and 6.

In such a unit which operates to lift liquid from the bottom of a well, the load on the upstroke is greater than the load on the downstroke as on the up-stroke the unit must lift a weight of liquid plus the weight of the plunger at the bottom of the well and the weight of the sucker rods extending therefrom to the top of the well and must also overcome friction, whereas on the down-stroke, the weight of the sucker rods and plunger are lowered abetted by the force of gravity.

To counterbalance this variation in load occurring in the operation of the pumping unit as a result of the transfer of a volume of liquid from the surge tank into the power cylinder on the upstroke, and the return of this liquid to the surge tank on the downstroke, compressed air is maintained in air tanks which communicate with the top of the surge tank, and balance is obtained thereby.

As the liquid is transferred from the comparatively small volume surge tank into the power cylinder on the upstroke, there is no appreciable pressure drop in the surge tank as a result thereof, since the comparatively extra large volume of air in the air tanks permits the air to occupy the space evacuated by the liquid with no noticeable reduction of the pressure in the air tank-surge tank system. This is true even though the pressure developed in the power unit on the upstroke is about two hundred pounds per square inch and on the downstroke, about one hundred pounds per square inch. On each upstroke of the power cylinder, work is being done accelerating the sucker rod string and the oil fluid column thereabove in order to transfer the oil from the well to storage tanks. Consequently the difference in liquid pressure in the power cylinder, as developed on the upstroke, and that occurring on the downstroke, is translated into actual work done on the upstroke.

Should there be an increase of the load which the pumping unit has to lift, or should there be leakage from the compressed air tank, an overbalance in favor of the liquid pressure occurs, so that the border plane between liquid pressure and air or gas ranges higher in the surge tank than a desired range. On the other hand, should an excess of air pressure develop, as by the lowering of the well load or by an increase in the temperature of the air, then there will be an overbalance in favor of air pressure, and the border plane between oil and gas will range lower in the surge tank, and below the predetermined desired range. To compensate for such occurrences, and to strive at maintaining at a predetermined desired range, the automatic regulating device of this invention is provided.

A control cylinder 1 has the piston 4, having the rod 5 connected thereto, inserted therewithin; the spring 6 is then inserted around the rod 5 to bear against the piston 4; and then the end plate 3 is fitted on over the rod 5 to close the cylinder, the bushing 7 thereof providing a bearing for the rod. The spring 9 is then inserted into the cylinder from the other end thereof; the adjustment device 10 is threaded into the end plate 2 and then the assembly of device and end plate is fitted to the cylinder 1 so that the adjustment plate 12 bears against the spring 9. As the rod 11 is threaded, the rotation thereof moves the plate 12 inwardly or outwardly to vary the tension of the spring 9 against the piston 4.

A line 14 is connected into the cylinder 1 near the end plate 2 and this line leads to a source of pressurized liquid as the power cylinder 15 of a power unit which is to be counter-balanced. A line 17, in turn, is connected into the cylinder 1 on the opposite side of the piston 4 from the line 14 and leads to an air cylinder or compressed air tank 18. This air tank in turn, is connected by means of the line 19 to a surge tank, not shown. The power cylinder 15, by means of the line 20, is connected to a pump or other fluid transfer device, not shown, which transfers liquid back and forth between the surge tank and the power cylinder.

A second cylinder 21 is provided which is closed by end plates 22 and 23 and it has the spool type piston 24 thereon with the rod 25 therefor extending through the end plate 23; the end plate 22 having therein the vent or discharge 26. A line 27 from the air cylinder 18 or any compressed air or gas reservoir is connected at opening 28 to the cylinder 21 and diametrically opposed thereto is the opening or vent 29. The line 31 branches off from the line 27 and connects into the cylinder 21 substantially centrally thereof and opposed to the line 31 on the side thereof, in the direction of the openings 28 and 29 is another connection 32.

The lines 31 and 32 are so spaced and of such size that they may both open at the same time into the space surrounding the reduced diameter 33 of the spool piston 24 when the piston is located as shown in Fig. 1. There is another connection 34 into the cylinder 21 adjacent the end plate 22 and the connection 32 joins this connection and a common lead 35 connects therefrom into the clutch 36 of the compressor transmission.

It can be seen that the arrangement of the spool piston 24 and cylinder 21 provides a complex three-way valve adapted to establish communication between air cylinder and compressor clutch, compressor clutch and atmosphere, and air cylinder and atmosphere.

The clutch 36 may be of any conventional air operated design and as disclosed in Fig. 4 it is keyed at 37 to the compressor shaft 38 and has mounted around the periphery thereof the rubber rim 39 which is outwardly faced with a friction surface 40 and which has an annular opening 41 therein. A radial passage 42 through the clutch 36 communicates with the annular opening 41 which in turn communicates with the annular groove 43 near the end of the shaft 38. This groove in turn communicates by means of the radial passage 44 with the axial passage 45 in the shaft 38 which communicates with the stationary terminal plug 46 with which the connection 35 communicates.

A bushing 48 is keyed at 51 to the shaft 38, a roller bearing 49 is mounted around the bushing 48, and the sprocket 50 is mounted to rotate therearound. The sprocket 50 has a recessed housing 52 in which the clutch 36 is confined so that when compressed air, from the connection 35, passes through the terminal block 46, the axial passage 45, the radial passage 44, the groove 43, the radial passage 42, and into the annular space 41 of the rubber rim 39, it expands the rim to bring the friction surface 40 into gripping contact with the housing 52. The sprocket 50 is driven from a prime mover by means of a V-belt, not shown; and when the compressor is not operating, the sprocket 50 merely rotates freely about the rollers of the bearing 49. However, when the friction surface 40 engages the sprocket housing 52, the sprocket 50 drives through the clutch 36 to rotate the shaft 38, and thereby drives the compressor 53 to supply air through the line 54 to the tank 18.

The piston rod 5 has two stops 56 and 57 slidably adjustable thereon, and a lever 58 has the head 59 thereof mounted to slide along the rod 5 so as to barely contact these stops at either end of the stroke when a previously correct relationship has been manually set between pressure in power cylinder 15 and air tank or tanks 18 for the particular well load. This lever 58 is pivoted at 61, and has a forked prong 62 to fit around a pin 63 on the piston rod 25.

In operation, should the liquid pressure in the power cylinder exceed the value at which the range of the predetermined balance with the compressed air pressure has been established, such pressure pushes the piston 4 to the right, as shown in Fig. 1, to bring the stop 56 on the piston rod 5 into contact with the lever head 59, and this, in turn, pivots the lever 58 about its pivot 61 so that the fork 62 thereof pushes the rod 25 and the spool piston 24 to the left.

This places the connection 31 in communication with the space around the reduced diameter of the spool 33, and also places the discharge connection 32 in communication therewith, so that compressed air from the cylinder 18 passes through the cylinder 21 and through the connection 35 into the clutch 36, as hereinabove described, to expand the rubber rim 39 and place the shoe 40 into gripping contact with the sprocket 50.

The prime mover then drives the sprocket 50, and the compressor 53 builds up the air pressure in the cylinder 18, and this compressed air discharges through the line 17 to build up pressure on the right side of the piston 4, and moves the piston 4 to the left as shown in Fig. 2.

This leftward motion of the piston 4 moves the stop 56 on the rod 5 so that it again barely contacts the lever head 59 at the end of the stroke. Thus the rod 5, as it returns to travel within the normal zone, slides along through the head 59 and pivots the lever 58 in a direction to move the fork 62 to the right, thereby causing the spool piston 64 to cover the connection 31 and to uncover the connection 34. This cuts off compressed air from the clutch 36 and permits the air that has been forced thereinto to bleed out through the lines 35 and 34 and back through the cylinder 21 and out through the vent or discharge 26. This breaks the contact of the gripping surface 40 with the sprocket 50 and disengages the sprocket 50 from driving the compressor.

Should the air pressure in the cylinder 18 increase with relation to the liquid pressure in the power cylinder 15, the piston 4 will be moved substantially to the left, as shown in Fig. 3, by the entry into the cylinder 1 of air under pressure through the connection 17. This results in the piston rod 5 moving to the left to bring the stop 57 into contact with the lever head 59 so that the fork 62 moves the piston rod 25 and spool piston 24 to the right, as shown in Fig. 3, to place the connection 28 and connection or vent 29 into communication with the space around the reduced diameter of the spool so that compressed air from the cylinder 18 bleeds through the cylinder 21 to the atmosphere and reduces the pressure in the right-hand side of the cylinder 1, thereby permitting the piston 4 to move back to the right. Now, when the piston 4 moves back to the right from the position shown in Fig. 3, the rod 5 slides along through the head 59 to pivot the lever 58 in a direction to move the fork 63 to the left, thereby moving the piston 24 to close the connections 33 and 29. Then under the limited differential between the cylinders 15 and 18 which characterizes normal operation, as shown in Fig. 2, the travel of piston 24 is not varied sufficiently to open communication between either connection 28 and vent 29, or connection 31 and connection 32.

As conditions vary widely in well pumping operations, the adjustment device 10, hereinabove described, is provided to adjust the length of piston travel for the varying requirements of various wells, so as to keep the stroke length within the capacity of the regulating device. Thus turning the threaded rod 11 so as to move the plate 12 inwardly preloads the springs 6 and 9 for a given load variation, and shortens the piston travel, and outward motion of the plate 12 in the control cylinder 1 lengthens the piston travel. In employing two types of gases, the theory of this invention is applicable if some dividing element, as a floating piston is provided in the surge tank to separate such gases.

Broadly, this invention considers a device which is designed to maintain a desired counterbalance between two gases, or a gas and a liquid which are brought into contact under pressure in a container, as a surge tank, there being a wide variation of pressures to which the counterbalancing elements are subjected, as the pressures experienced in the downstroke and the upstroke of a power unit as used in pumping fluid from oil wells.

What is claimed is:

1. A regulating device for operation with, a tank containing compressed air under variable pressure and having an outlet, a cylinder containing liquid under variable pressure, means connecting said tank and said liquid cylinder to bring said pressure liquid and said compressed air to bear against each other, a shaft driven compressor connected to supply compressed air to said tank, a drive pulley rotatable on said compressor shaft, clutch means including a compressed air inlet and actuated by the admission of compressed air thereinto to connect said pulley to drive said compressor shaft, said regulating device comprising a control cylinder connected at one end to said liquid cylinder and at the other end to said tank, a piston slidable therein between said connections, resilient means bearing on either side of said piston against the pressure exerted on the opposite side thereof, a rod connected to said piston and slidably extending through the compressed air receiving end of said control cylinder, a cylindrical valve body, a spool shaped valve with ends slidable within said body wall and with a stem slidable through a first end of said body, linkage means connecting said valve stem and said piston rod, three conduits connected to said body at axially spaced apart points and including said body as a part thereof, said conduits successively from said first end establishing communication between said tank outlet and the atmosphere, between said tank outlet and said clutch inlet, and from said clutch inlet back to the atmosphere, said spool shaped valve being so spaced in axial dimensions with relation to the axial spacing of said conduits in said body that a bias in favor of liquid pressure in said control cylinder actuates said spool shaped valve to occlude said first and third conduits while keeping uncovered said second conduit to admit compressed air to said clutch to drive said compressor, that a bias in favor of air pressure in said control cylinder actuates said spool shaped valve to occlude said second conduit while keeping uncovered said third and first conduits to respectively maintain said compressor stopped and to bleed compressed air from said tank through said first conduit, and that a balance between liquid pressure and compressed air pressure in said control cylinder actuates said spool shaped valve to occlude said first and second conduits while keeping uncovered said third conduit to maintain said compressor stopped.

2. A regulating device for operation with, a source of variable pressure gas and an opposed source of variable pressure liquid, and means actuated upon admission of pressurized gas thereinto to increase the pressure of the source of gas, said regulating device comprising, a control cylinder connected at one end to said source of liquid pressure and at the other end to said source of gas pressure, a piston in said control cylinder biased between said connections and having a rod extending therefrom through said compressed gas connected end, a cylindrical valve body, a spool shaped valve slidable within said body wall and with a stem slidable through a first end of said body, linkage means connecting said valve stem and said piston rod, conduits connected to said body at axially spaced apart points and including said body as a part thereof, said conduits successively from said first end comprising a first conduit establishing communication between said gas source and the atmosphere, a second conduit establishing communication between said source of gas and said pressurized gas actuated means, and a third conduit establishing communication from said pressurized gas actuated means back to the atmosphere, said spool shaped valve being so spaced in axial dimensions with relation to the axial spacing of said conduits in said body that a bias in favor of liquid pressure in said control cylinder actuates said spool shaped valve to occlude said first and third conduits while keeping uncovered said second conduit, that a bias in favor of air pressure in said control cylinder actuates said spool shaped valve to occlude said second conduit while keeping uncovered said first and third conduits respectively, and that a balance between liquid pressure and compressed air pressure in said control cylinder actuates said spool shaped valve to occlude said first and second conduits while keeping uncovered said third conduit.

3. A regulating device for operation with, a source of variable pressure gas and an opposed source of variable pressure liquid and means actuated upon admission of pressurized gas thereinto to increase the pressure of the source of gas, said regulating device comprising, a control cylinder connected at one end to said source of liquid pressure and at the other end to said source of gas pressure, a piston in said control cylinder biased between said connections and having a rod extending therefrom through said compressed gas connected end, a cylindrical valve body, a spool shaped valve slidable within said body wall and with a stem slidable through a first end of said body, a linkage assembly connecting said valve stem and said piston rod, conduits connected to said body at axially spaced apart points and including said body as a part thereof, said conduits successively from said first end comprising a first conduit establishing communication between said gas source and the atmosphere, a second conduit establishing communication between said source of gas and said pressurized gas actuated means, and a third conduit establishing communication from said pressurized gas actuated means back to the atmosphere, said spool shaped valve being so connected for actuation by said linkage assembly, and being so spaced in axial dimensions with relation to the axial spacing of said conduits in said body that said linkage assembly is operable respectively responsive to a bias in favor of liquid pressure in said control cylinder, a bias in favor of air pressure in said control cylinder, and a balance between liquid pressure and compressed air pressure in said control cylinder, to actuate said spool shaped valve to occlude said first and third conduits while keeping uncovered said second conduit, to actuate said spool shaped valve to occlude said second conduit while keeping uncovered said first and third conduits, and to actuate said spool shaped valve to occlude said first and second conduits while keeping uncovered said third conduit.

4. A regulating device for operation with, a source of variable pressure gas and an opposed source of variable pressure liquid, and means actuated upon admission of pressurized gas thereinto to increase the pressure of the source of gas, said regulating device comprising, a control cylinder connected at one end to said source of liquid pressure and at the other end to said source of gas pressure, a piston in said control cylinder biased between said connections and having a rod extending therefrom through said compressed gas connected end, a cylindrical valve body, a valve slidable within said body wall and with a stem slidable through a first end of said body, a linkage assembly connecting said valve stem and said piston rod, conduits connected to said body at axially spaced apart points and including said body as a part thereof, said conduits successively from said first end comprising a first conduit establishing communication between said gas source and the atmosphere, a second conduit establishing communication between said source of gas and said pressurized gas actuated means, and a third conduit establishing communication from said pressurized gas actuated means back to the atmosphere, said valve being operable responsive to movement of said linkage assembly so that a bias in favor of liquid pressure in said control cylinder actuates said valve to occlude said first and third conduits while keeping uncovered said second conduit, so that a bias in favor of air pressure in said control cylinder actuates said valve to occlude said second conduit while keeping uncovered said first and third conduits respectively, and so that a balance between liquid pressure and compressed air pressure in said control cylinder actuates said valve to occlude said first and second conduits while keeping uncovered said third conduit.

5. A regulating device for operation with a source of variable pressure gas and an opposed source of variable pressure liquid and means actuated upon admission of pressurized gas thereinto to increase the pressure of the source of gas, said device including a biasing means including a biased means having pressure liquid from said liquid pressure source bearing on one side thereof and having pressure gas from said pressure gas source bearing on the opposite side thereof, a valve housing, three conduits, each including said housing, one conduit for establishing communication between said source of gas and the atmosphere, a second conduit for establishing communication between said source of gas and said pressurized gas actuated means to actuate said pressurized gas actuated means to increase the pressure of said source of gas, and a third conduit for establishing communication between said pressurized gas actuated means and the atmosphere to inactivate said pressurized gas actuated means and to bleed pressurized gas therefrom to the atmosphere, a valve element operable in said valve housing to block off two of said conduits while opening one thereof, and a linkage means connected at one end to said biased means to move therewith and connected at the other end to actuate said valve element to open said first conduit when said biased means is biased beyond a predetermined point by excess of source of gas pressure over said liquid pressure, to open said second conduit when said biased means is biased beyond a predetermined point by excess of said liquid pressure over said source of gas pressure, and to hold open said third conduit when said biased means is not biased beyond either limiting point.

6. A regulating device as claimed in claim 5 in which said biased means includes stops at predetermined positions thereon to co-operate with said linkage to limit valve element travel in either direction.

References Cited in the file of this patent

UNITED STATES PATENTS

| Number | Name | Date |
|---|---|---|
| 1,231,584 | Ferris | July 3, 1917 |
| 2,215,617 | Owen | Sept. 24, 1940 |
| 2,385,664 | Warner | Sept. 25, 1945 |